(12) United States Patent
Hill

(10) Patent No.: US 8,807,832 B2
(45) Date of Patent: Aug. 19, 2014

(54) DEVICE FOR SPATIALLY RESOLVED TEMPERATURE MEASUREMENT

(75) Inventor: Wieland Hill, Odenthal (DE)

(73) Assignee: Lios Technology, GmbH, Cologne (DE)

( * ) Notice: Subject to any disclaimer, the term of this patent is extended or adjusted under 35 U.S.C. 154(b) by 227 days.

(21) Appl. No.: 12/945,307

(22) Filed: Nov. 12, 2010

(65) Prior Publication Data

US 2011/0058590 A1    Mar. 10, 2011

Related U.S. Application Data

(63) Continuation of application No. PCT/EP2009/001879, filed on Mar. 14, 2009.

(30) Foreign Application Priority Data

May 15, 2008   (DE) .......................... 10 2008 023 777

(51) Int. Cl.
*G01J 5/00*       (2006.01)
*G01K 3/00*      (2006.01)
*G01K 11/00*    (2006.01)
*G01K 11/32*    (2006.01)

(52) U.S. Cl.
CPC ..................................... *G01K 11/32* (2013.01)
USPC ............ 374/131; 374/161; 374/130; 374/137

(58) Field of Classification Search
USPC .................. 374/161, 130, 131, 137
See application file for complete search history.

(56) References Cited

U.S. PATENT DOCUMENTS

| 5,592,282 | A | 1/1997 | Hartog et al. |
| 5,686,986 | A | 11/1997 | Li et al. |
| 5,699,461 | A | 12/1997 | Minemoto et al. |
| 6,025,917 | A * | 2/2000 | Toyonaga et al. ............. 356/364 |
| 6,137,565 | A | 10/2000 | Ecke et al. |
| 6,174,080 | B1 * | 1/2001 | Jennings ........................ 374/131 |
| 6,490,538 | B1 | 12/2002 | Glombitzs et al. |
| 6,574,037 | B2 * | 6/2003 | Islam et al. ................... 359/334 |
| 6,891,998 | B2 | 5/2005 | Jones |
| 7,333,680 | B2 | 2/2008 | Yong et al. |
| 2004/0062476 | A1 * | 4/2004 | Jones .............................. 385/30 |
| 2005/0140966 | A1 * | 6/2005 | Yamate et al. ............... 356/73.1 |

(Continued)

FOREIGN PATENT DOCUMENTS

DE   196 38 390 B4   3/1997
DE   198 21 616 A1   11/1999

(Continued)

OTHER PUBLICATIONS

German Language Search Report dated Oct. 31, 2008.

(Continued)

*Primary Examiner* — Mirellys Jagan

(74) *Attorney, Agent, or Firm* — Cohen & Hildebrand, PLLC

(57) ABSTRACT

Apparatus for a spatially resolved temperature measurement, with at least one optical fiber (6) for the spatially resolved temperature measurement, and at least one laser light source (2) producing light (3, 23) which can be coupled into the optical fiber (6), wherein the portions of the light (3, 23) backscattered in the optical fiber (6) can be coupled out of the optical fiber (6) and evaluated. The apparatus further includes means for reducing polarization-induced effects, wherein the means may be, for example, a polarization modifier (4) capable of at least partially depolarizing the light (3).

10 Claims, 2 Drawing Sheets

(56) References Cited

U.S. PATENT DOCUMENTS

| | | | |
|---|---|---|---|
| 2006/0018586 A1* | 1/2006 | Kishida | 385/12 |
| 2006/0239330 A1* | 10/2006 | Yamate et al. | 374/161 |
| 2006/0285850 A1* | 12/2006 | Colpitts et al. | 398/108 |
| 2007/0058897 A1 | 3/2007 | Yong et al. | |
| 2007/0297054 A1 | 12/2007 | Yao et al. | |
| 2008/0018903 A1 | 1/2008 | Bao et al. | |
| 2008/0068586 A1* | 3/2008 | Kishida et al. | 356/32 |
| 2008/0246947 A1* | 10/2008 | Lees et al. | 356/51 |

FOREIGN PATENT DOCUMENTS

| | | |
|---|---|---|
| DE | 694 33 154 T2 | 4/2004 |
| DE | 695 34 442 T2 | 6/2006 |
| EP | 0692705 A1 | 1/1996 |
| EP | 0898151 A2 | 2/1999 |
| WO | 2005/024349 A1 | 3/2005 |

OTHER PUBLICATIONS

Chinese Language Search Report dated Apr. 18, 2012. English-language translation provided.
European Office Action for corresponding European Application No. 09745482.1 dated May 15, 2013.
Chinese-language Second Office Action for related Chinese Application No. 200980117464.8 dated Jan. 7, 2013. English-language translation provided.
Xu, Weijun, et al., "Application Research on Temperature Monitoring in Concrete of Jing Hong Hydropower Station by Distributed Optical Fiber Temperature Measurement System", Journal of Hydroelectric Engineering, Feb. 28, 2007, pp. 98, paragraphs 2-3; vol. 26, No. 1, Wuhan, China. English-language Abstract provided.

* cited by examiner

DEVICE FOR SPATIALLY RESOLVED TEMPERATURE MEASUREMENT

This is a continuation application of PCT/EP2009/001879, filed on Mar. 14, 2009, claiming priority to DE 10 2008 023 777.9 filed on May 15, 2008.

BACKGROUND OF THE INVENTION (1) Field of the Invention

The present invention relates to an apparatus for spatially resolved temperature measurement according to the preamble of claim 1.

(2) Description of Related Art

An apparatus of the aforedescribed type is disclosed, for example, in EP 0 692 705 A1. Fiber-optic temperature measurement systems (Distributed Temperature Sensing—DTS) can employ optical effects in optical fibers for spatially resolved temperature measurements. For example, the effect caused by Raman scattering can be used. The radiation from a narrowband source of electromagnetic radiation (e.g., from a laser) is inelastically scattered in the fiber material. The ratio of the intensities of the scattered radiation with a wavelength shorter than the excitation wavelength (anti-Stokes scattered radiation) and of the scattered radiation with a wavelength longer than the excitation wavelength (Stokes scattered radiation) is temperature-dependent and can be used to determine the temperature. By using frequency-domain techniques (Optical Frequency Domain Reflectometry—OFDR), which are described in EP 0 692 705 A1 and EP 0 898 151 A2, or pulse techniques (Optical Time-Domain Reflectometry—OTDR), the temperature can be determined along the fiber with spatial resolution. Such a temperature measurement systems can be used, for example, for monitoring fires in tunnels and ducts, for monitoring power cables and pipelines, and in the oil and gas exploration.

A DTS device generally includes, in addition to the corresponding coupling optics, the following essential optical components:
a laser light source,
a spectral splitter for coupling the light from a laser light source into the optical fiber used for the measurement and for separating the Raman scattered light portions of the laser light backscattered from the optical fiber,
an optical fiber used for the measurement,
a spectral splitter for separating Stokes and anti-Stokes scattered light,
filters for the Stokes and the anti-Stokes scattered light,
detectors for the Stokes and the anti-Stokes scattered light.

Instead of two filters, changeable or interchangeable filters can also be used for the Stokes and the anti-Stokes scattered light. When using interchangeable filters, both channels are measured sequentially. This is disadvantageous for the measurement time, but may have cost advantages as well as advantages for the accuracy, because identical channels are used for both signals.

A DTS device can principally be constructed mostly as free space optics. However, fiber-optic setups are frequently employed for a number of practical reasons (efficiency, stability).

One problem with spatially resolved temperature measurements using optical fibers is the change of the polarization along the fiber. This occurs mostly, but not exclusively, with single mode fibers. The exciting radiation is typically polarized. Because the Raman scattering can also be polarized, the Raman scattered light portions returned from the fiber can also be polarized. The Raman scattered light is detected with spectral splitters, filters and possibly other polarization-dependent components. The result of the measurement can therefore depend on the polarization.

In multimode fibers, the different modes propagate with slightly different velocities, and the effects of the fiber on the polarization are also mode-dependent. A more or less homogeneous mixture of different polarization states is formed over longer distances. The problem associated with polarization effects in DTS measurements hence exists predominantly in single mode fibers and in measurements with multimode fibers having few modes or short lengths.

In the fiber, the polarization plane can be rotated or the polarization can be changed in other ways by effects, such as stress-induced birefringence. The measured signals then depend not only in the desired manner on the local temperature, but also on the local polarization at the measurement location or the change of the polarization on the path through the fiber. Even if the polarization effects affect the measured quantities only slightly, they can still have a significant effect on the determination of the temperature, possibly reaching, for example, several ° C. Such effects can therefore limit the temperature resolution of DTS devices. In particular in devices operating with single mode fibers, modulations on the temperature curves with an amplitude of several ° C. and a wavelength of several meters to several 10 m are observed. These modulations are caused by rotations of the polarization plane due to stress-induced birefringence in the fiber material.

The problem forming the basis for the present invention is to provide an apparatus of the aforedescribed type which is capable of attaining higher temperature resolution and/or spatial resolution.

BRIEF SUMMARY OF THE INVENTION

This is attained according to the invention with an apparatus of the aforedescribed type having the characterizing features of claim 1. The dependent claims recite preferred embodiments of the invention.

According to claim 1, the apparatus includes means for reducing polarization-induced effects. By employing these means, the impact of the aforedescribed polarization effects can be reduced such that the temperature resolution and/or the spatial resolution of the apparatus can be improved.

For example, the means for reducing polarization-induced effects may include a polarization modifier, which may at least partially depolarize the light from the at least one laser light source before the light is coupled into the optical fiber, or which may temporally and/or spatially change the polarization state of the light before coupling.

The polarization modifier is intended to affect the polarization of the laser light or potentially also of the scattered light, so that the polarization dependence of components, such as spectral splitters and filters is no longer a factor.

An ideal polarization modifier would cancel the polarization of the light and therefore operate as a depolarizer. However, this is not possible in all situations or is associated with significant complexity.

In particular, coherent radiation is always polarized, so that only its polarization state (linear, circular, elliptic, polarization axes) can be affected.

On the other hand, actual depolarization is not required for attaining the desired polarization independence of the detection. Instead, polarization modifiers may be used which temporally and/or spatially change the polarization state and hence produce averaging of different polarization components in the detection.

A polarization modifier which is particularly suited for an apparatus according to the invention operates as follows:

splitting the light into two portions of similar intensity,
rotating the polarization plane of one portion by 90°,
delaying one portion by a path length which is greater than the coherence length of the at least one laser light source, but smaller than the desired spatial resolution of the apparatus,
coupling both portions into the optical fiber used for the temperature measurement.

This arrangement has no moving parts, does not require a supply of energy and can be implemented cost-effectively. The delay path length must be greater than the coherence length in order to prevent polarized light to be present after the depolarizer. Because large delay path lengths affect the spatial resolution, their use in high-resolution apparatuses may possibly be limited. However, other solutions can be used for high-resolution apparatuses, for example optically active rotating discs (half-wavelength plates), electroactive cells for changing the polarization, or mechanically stressed optical fibers, which can alter the polarization due to birefringence induced by the mechanical stress.

A polarization modifier can generally be constructed mostly from free space optics. However, the polarization modifier may also be constructed with fiber optics.

Alternatively or in addition, the means for reducing polarization-induced effects may include at least one filter having properties, in particular its transmission, which differ for two polarization directions, or for each pair of mutually orthogonal polarization directions, by less than 10%, in particular less than 5%, preferably less than 1%.

Alternatively or in addition, the means for reducing polarization-induced effects may include at least one spectral splitter with properties, in particular its transmission and/or its reflection, which differ for two polarization directions, or for each pair of mutually orthogonal polarization directions, by less than 10%, in particular less than 5%, preferably less than 1%.

These two measures reduce polarization-induced effects on the temperature measurement.

The operation of spectral splitters and other wavelength-selective filters can significantly depend on the polarization. This polarization dependence is caused, for example, by polarization-dependent reflection and diffraction at oblique light incidence.

One approach for reducing the polarization dependence of thin-film filters is the use of special layer designs which have very similar properties at the respective wavelength for both polarization components.

Another approach is the use of small angles of incidence. The filters are polarization-independent for normal incidence. At small angles of incidence, for example less than 10°, polarization effects can be sufficiently small so as to allow precise temperature measurements with an apparatus according to the invention.

BRIEF DESCRIPTION OF THE DRAWINGS

Other features and advantages of the present invention will become evident from the following description of preferred exemplary embodiments with reference to the appended drawings, wherein.

DETAILED DESCRIPTION OF THE INVENTION

Identical elements or elements performing the same function are indicated in the figures with identical references symbols.

Figure 1:
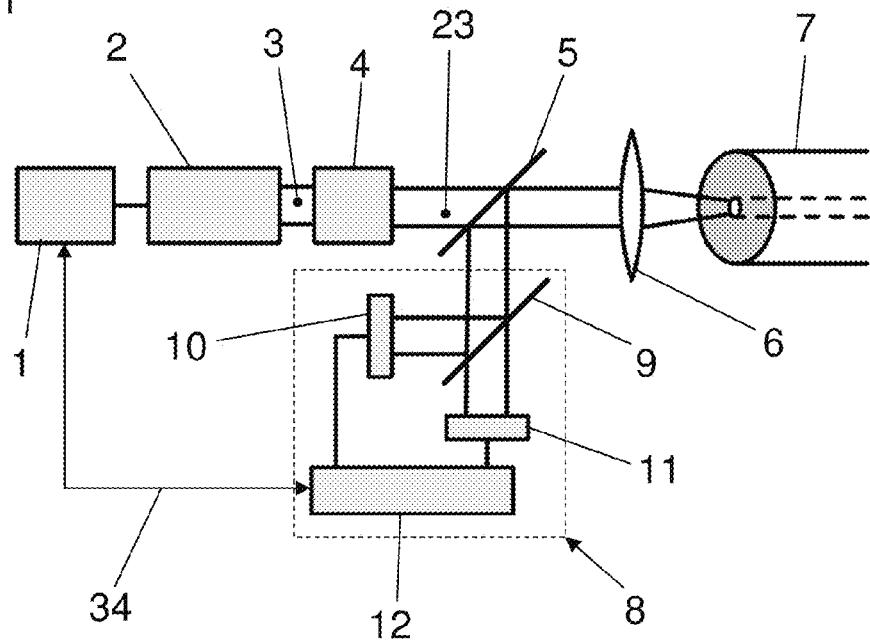
FIG. 1 is a schematic diagram of a first embodiment of an apparatus according to the invention.

FIG. 1 illustrates an embodiment of an apparatus according to the invention with a laser light source 2 controlled by control means 1. The light 3 from the laser light source 2 passes through a polarization modifier 4 which can depolarize the light 3 or temporally and/or spatially change the polarization state of the light 3. After passing through the polarization modifier 4, the light 3 is coupled by coupling means, which include a spectral splitter 5 and for example a lens 6, into an optical fiber 7 used for the temperature measurement.

The lens 6 and the spectral splitter 5 also operate as decoupling means and can transmit the backscattered portions of the light 3 generated by the laser light source 2 to schematically indicated evaluation means 8. The evaluation means 8 include, for example, a spectral splitter 9 for the laser wavelength and the Raman scattered radiation as well as two detectors 10, 11 for the Stokes and the anti-Stokes scattered radiation, with unillustrated filters being arranged before the detectors 10, 11. The evaluation means 8 further include measurement electronics 12. Optionally, a detector for the Rayleigh wavelength can also be provided.

The filters can be constructed so that they have similar transmission characteristics for mutually orthogonal linear polarizations. For example, the transmission at a Raman wavelength to be detected for two or for each pair of mutually orthogonal polarization directions may differ by less than 1%. The polarization-dependent effect of the filters on the temperature measurement is hereby minimized.

The spatially resolved temperature measurement in the optical fiber 7 can here be performed with a method corresponding to the OFDR method described in EP 0 692 705 A1. In particular, the light 3 from the laser light source 2 can be frequency-modulated, and a Fourier transformation can be performed in the evaluation means 8.

FIG. 1 also shows a connection 34 between the control means 1 of the laser light source 2 and the measurement electronics 12. This connection is used for synchronizing the laser light source 2 and the measurement electronics 12.

Figure 2:
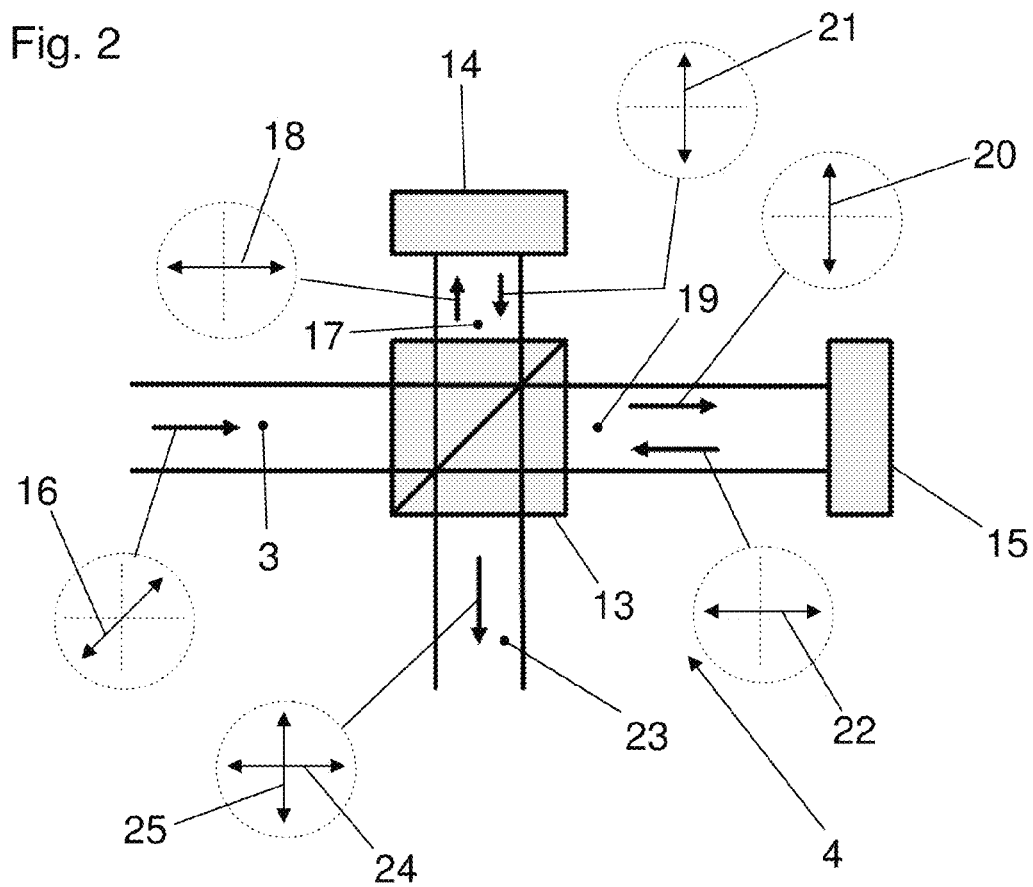
FIG. 2 shows an exemplary embodiment of a polarization modifier.

FIG. 2 shows an exemplary embodiment of a polarization modifier 4. The illustrated polarization modifier 4 includes a polarization beam splitter 13 and two Faraday mirrors 14, 15, with each of the Faraday mirrors including a mirror and a polarization rotator. The polarization rotator can be implemented as a 45° Faraday rotator or a quarter-waveplate.

The light 3 from the laser light source 2 is incident on the polarization beam splitter 13 from the left side in FIG. 2. The light 2 should have a linear polarization 16 which is oriented at an angle of 45° with respect to the parallel and orthogonal polarization or a vertical direction in FIG. 2, respectively. A first portion 17 of the light 3 is reflected upward by the polarization beam splitter 13. This first portion 17 has a polarization 18 corresponding to a parallel polarization. A second portion 19 of the light 3 passes unimpededly through the polarization beam splitter 13. The second portion 19 has a polarization 20 which corresponds to an orthogonal polarization.

The first portion 17 is reflected by the first Faraday mirror 14 downward in FIG. 2, whereby its polarization is rotated by 90°, thus producing a orthogonal polarization 21. The second portion 19 is reflected by the second Faraday mirror 15 to the left in FIG. 2, whereby its polarization is also rotated by 90°, thus producing a parallel polarization 22. When the two portions 17, 19 are once more incident on the polarization beam splitter 13, they are combined by the polarization beam splitter 13 and exit therefrom downward in FIG. 2.

The optical path of the first portion 17 from the polarization beam splitter 13 through the first Faraday mirror 14 back to the polarization beam splitter 13 is hereby shorter than the optical path of the second portion 19 from the polarization beam splitter 13 through the second Faraday mirror 15 back to the polarization beam splitter 13. This is attained, in particular, with a greater distance between the polarization beam splitter 13 and the second Faraday mirror 15 compared to the distance between the polarization beam splitter 13 and the first Faraday mirror 14. The resulting optical path difference of the portions 17, 19 should be greater than the coherence length of the light 3.

In this situation, the light 23 exiting from the polarization beam splitter 13 downward in FIG. 2 (see also FIG. 1) has a component with orthogonal polarization 24 as well as a component with a parallel polarization 25, which are not mutually coherent. This depolarizes the light 23 in an ideal situation.

According to a preferred embodiment of the present invention, both the polarization beam splitter 13 as well as the entire polarization modifier 4 may be constructed of fiber optic components. It would be possible to construct the polarization modifier 4 as a single-piece fiber optic module which can be connected, in particular, by way of optical fibers with the other components of the apparatus according to the invention for a spatially resolved temperature measurement.

The polarization modifier 4 depicted in FIG. 2 is only one of many possible examples. This and other examples of suitable polarization modifiers are disclosed in US 2007/0297054.

Figure 3:
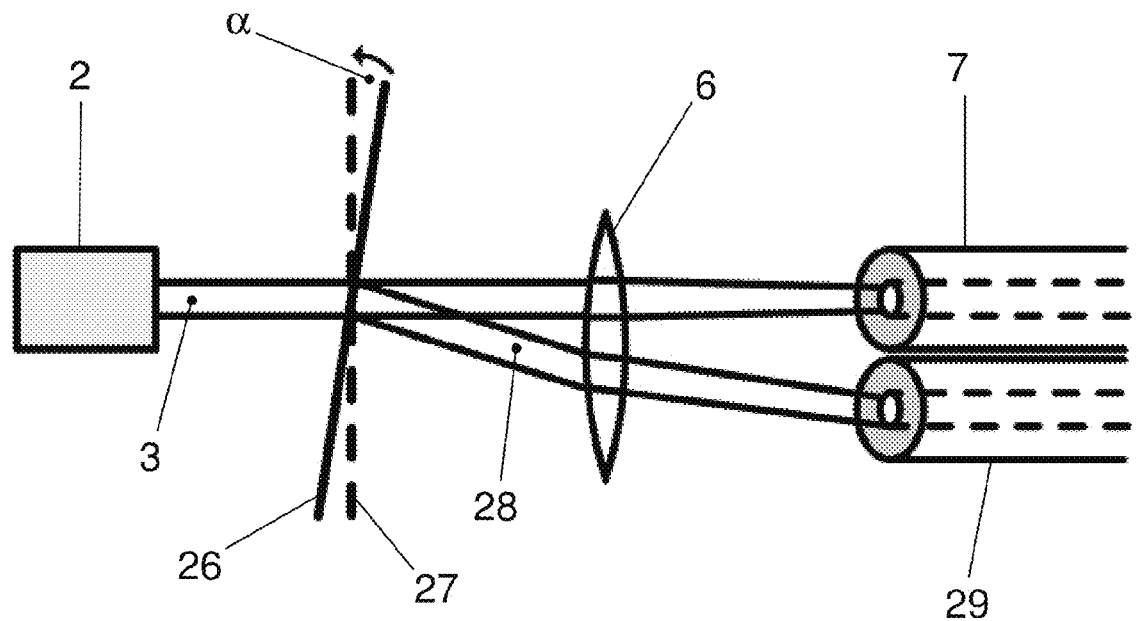
FIG. 3 shows a detail of a schematic view of a second embodiment of an apparatus according to the invention.

FIG. 3 shows a spectral splitter 26 which can be used instead of the spectral splitter 5 of FIG. 1. The spectral splitter 26 is tilted with respect to the vertical 27 in FIG. 3 by an angle α less than 10°. The angle of incidence under which the light 3 is incident on the spectral splitter 26 is then also less than 10°. The portions 28 of the light 3 backscattered from the optical fiber 6 are reflected by the spectral splitter 26 at an angle 2α and coupled into an optical fiber 29 which is constructed to supply the detected components 28 to the evaluation means 8.

Due to the almost orthogonal incidence on the spectral splitter 26, the spectral splitter 26 operates substantially polarization-independent.

Figure 4:
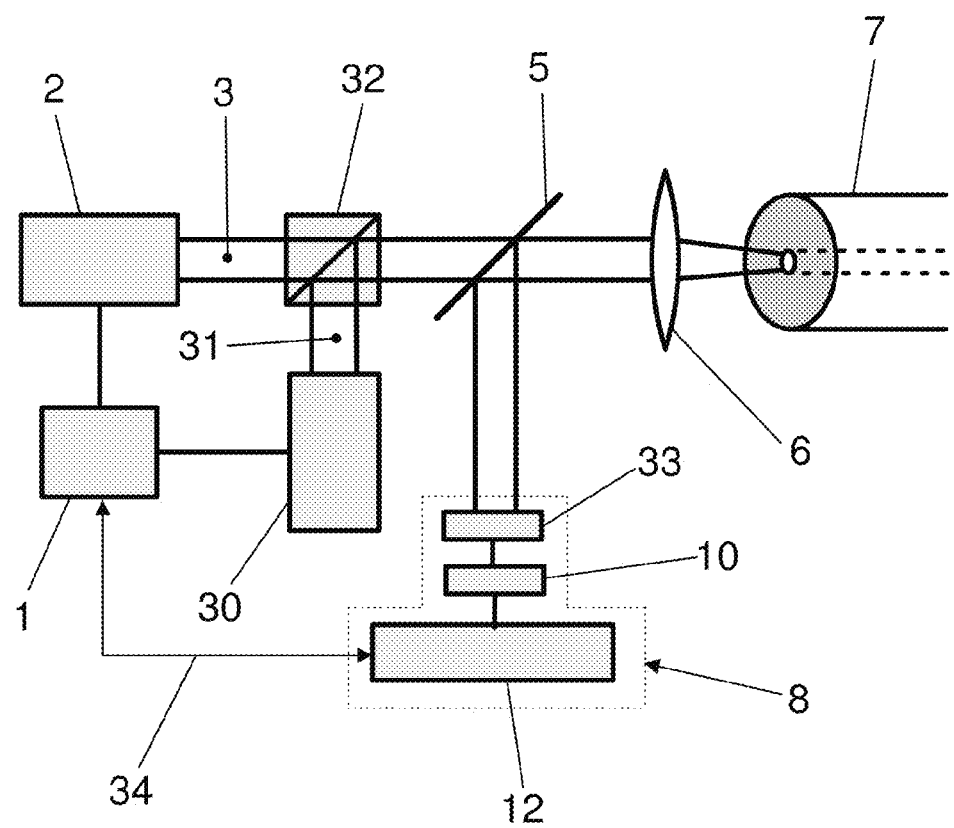
FIG. 4 is a schematic diagram of a third embodiment of an apparatus according to the invention.

The embodiment of an apparatus according to the invention illustrated in FIG. 4 includes, in addition to a first laser light source 2, a second laser light source 30 which is also controlled by the control means 1. The two laser light sources 2, 30 have a different polarization, in particular a mutually orthogonal linear polarization, and are not mutually coherent. The light 3, 31 from the laser light sources 2, 30 is combined by a polarization coupler 32 and coupled into the optical fiber 7 by way of the spectral splitter 5 and the lens 6. The portions of the light 3, 31 produced by the laser light sources 2, 30 and backscattered in the optical fiber 7 are supplied via the lens 6 and the spectral splitter 5 to schematically indicated evaluation means 8. The evaluation means 8 include, for example, a filter 33 for the Raman scattered radiation and a detector 10 for the Stokes scattered radiation. The filter 33 is here constructed as an interchangeable filter, so that the two channels (Stokes and anti-Stokes scattered radiation) can be measured consecutively. Additionally, the evaluation means 8 include measurement electronics 12.

Because the light 3, 31 backscattered in the optical fiber 6 has portions with mutually orthogonal linear polarization which are not mutually coherent, polarization-dependent effects known from conventional devices are by and large eliminated.

FIG. 4 also indicates a connection 34 between the control means 1 of the laser light sources 2, 30 and the measurement electronics 12. This connection is used for synchronizing the laser light sources 2, 30 with the measurement electronics 12.

The invention claimed is:

1. A spatially resolved temperature measurement apparatus, comprising:
    at least one optical fiber for the spatially resolved temperature measurement,
    at least one laser light source producing light that is coupled into the optical fiber, wherein portions of the light generated by the laser light source and backscattered in the optical fiber are coupled out of the optical fiber, and
    at least one filter for reducing polarization-induced effects of the spatially resolved temperature measurement, the at least one filter having properties, that differ for two orthogonal polarization directions or for each pair of mutually orthogonal polarization directions by less than 10%, wherein the at least one filter is wavelength selected to filter out Raman scattered radiation.

2. The apparatus according to claim 1, wherein in the apparatus the ratio of intensity of a Stokes scattered radiation to intensity of an anti-Stokes scattered radiation of the light from the at least one laser light source coupled into the optical fiber is used for the temperature measurement.

3. The apparatus according to claim 1, wherein the at least one filter having properties, that differ for each of the pair of mutually orthogonal polarization directions by less than 5%.

4. The apparatus according to claim 1, wherein the at least one filter having properties, that differ for each of the pair of mutually orthogonal polarization directions by less than 1%.

5. A spatially resolved temperature measurement apparatus using an Optical Frequency Domain Reflectometry method or an Optical Time Domain Reflectometry method, comprising:
    at least one optical fiber for the spatially resolved temperature measurement,
    at least one laser light source producing light that is coupled into the optical fiber, wherein portions of the light generated by the laser light source and backscattered in the optical fiber are coupled our of the optical fiber, and
    means for reducing polarization-induced effects of the spatially resolved temperature measurement; the means for reducing polarization-induced effects including: (i) at least one filter having properties: that differ for two orthogonal polarization directions or for each pair of mutually orthogonal polarization directions by less than 10%; and/or (ii) at least one spectral splitter having properties that differ for two orthogonal polarization directions or for each pair of mutually orthogonal polarization directions by less than 10%,
    wherein the at least one spectral splitter allows light having a first wavelength to pass through and reflects light having a second wavelength,
    wherein the at least one spectral splitter is designed so that:
        (a) the first wavelength corresponds to the laser wavelength and the second wavelength corresponds to the Raman scattered radiation; (b) the second wavelength corresponds to the laser wavelength and the first wavelength corresponds to the Raman scattered radiation; (c) the first wavelength corresponds to the Stokes-scattered-radiation and the second wavelength corresponds to the anti-Stokes-scattered radiation; or (d) the second wavelength corresponds to the anti-Stokes-scattered radiation and the first wavelength corresponds to the Stokes-scattered-radiation.

6. The apparatus according to claim 5, wherein the at least one spectral splitter having properties that differ for each of the pair of mutually orthogonal polarization directions by less than 5%.

7. The apparatus according to claim 5, wherein the at least one spectral splitter having properties that differ for each of the pair of mutually orthogonal polarization directions by less than 1%.

8. The apparatus according to claim 5, wherein the spectral splitter is arranged in the apparatus such that the light and/or the portions of the light backscattered from the optical fiber are incident on the spectral splitter at an angle (a) of less than 20°.

9. The apparatus according to claim 8, wherein the light and/or the portions of the light backscattered from the optical fiber are incident on the spectral splitter at an angle ($\alpha$) of less than 10°.

10. A spatially resolved temperature measurement apparatus, comprising:

at least one optical fiber for the spatially resolved temperature measurement, a first laser light source producing light that is coupled into the optical fiber, wherein portions of the light generated by the first laser light source and backscattered in the optical fiber are coupled out of the optical fiber, and a second laser light source for reducing polarization-induced effects of the spatially resolved temperature measurement, the second laser light source emitting light coupled into the optical fiber in addition to the light from the first laser light source, wherein the portions of the light produced by the second light source and backscattered in the optical fiber is also coupled out of the optical fiber, and wherein the light, from the second light source coupled into the optical fiber has a polarization that is different from the polarization of the light from the first laser light source coupled into the optical fiber;

wherein the first and second laser light sources have the same wavelength, wherein both laser light sources are not mutually coherent.

* * * * *